US012783274B1

(12) United States Patent
Kumar

(10) Patent No.: US 12,783,274 B1
(45) Date of Patent: Nov. 3, 2026

(54) ACCELERATING REMEDIAL ACTIONS FOR NETWORK TRAFFIC OF UNRESPONSIVE VIRTUAL MACHINES

(71) Applicant: Amazon Technologies, Inc., Seattle, WA (US)

(72) Inventor: Rajeev Kumar, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 601 days.

(21) Appl. No.: 18/180,075

(22) Filed: Mar. 7, 2023

(51) Int. Cl.

| | |
|---|---|
| ***G06F 9/455*** | (2018.01) |
| ***H04L 45/00*** | (2022.01) |
| ***H04L 47/125*** | (2022.01) |
| *H04L 9/40* | (2022.01) |

(52) U.S. Cl.
CPC .......... *G06F 9/45558* (2013.01); *H04L 45/70* (2013.01); *G06F 2009/4557* (2013.01); *G06F 2009/45591* (2013.01); *G06F 2009/45595* (2013.01); *H04L 47/125* (2013.01); *H04L 63/0478* (2013.01)

(58) Field of Classification Search
None
See application file for complete search history.

(56) References Cited

U.S. PATENT DOCUMENTS 8,751,857 B2 6/2014 Frenkel et al.
8,862,727 B2 10/2014 Jayachandran et al.
9,081,750 B2 7/2015 Dake et al.
10,379,922 B1 * 8/2019 Bell .................... G06F 11/0712
10,437,621 B2 10/2019 Haque et al.
10,474,548 B2 11/2019 Sanakkayala et al.
10,530,837 B2 1/2020 Bala et al.
11,609,776 B1 * 3/2023 Qu .......................... G06F 9/546
2008/0256533 A1 * 10/2008 Ben-Yehuda ....... G06F 9/45558 718/1
2011/0107148 A1 * 5/2011 Franklin ............. G06F 11/0748 718/1
2013/0259037 A1 * 10/2013 Natarajan ........... H04L 12/4641 370/390
2014/0096134 A1 * 4/2014 Barak .................. G06F 21/566 718/1
2014/0101489 A1 * 4/2014 Yang .................. G06F 11/0793 714/38.13

(Continued)

OTHER PUBLICATIONS

J. Postel, "Internet Control Message Protocol: DARPA Internet Program Protocol Specification," Sep. 1981, pp. 1-21.

*Primary Examiner* — Abu Zar Ghaffari
(74) *Attorney, Agent, or Firm* — Robert C. Kowert; Kowert, Hood, Munyon, Rankin & Goetzel, P.C.

(57) ABSTRACT

An encapsulation packet, formatted according to an encapsulation protocol, is obtained at a virtualization manager of a server from a packet processing intermediary. The virtualization manager determines that the encapsulation packet includes an encapsulated packet directed to a virtualized run-time environment which was launched at the server. In response to a determination, by the virtualization manager, that the virtualized run-time environment is unable to process the encapsulated packet, the virtualization manager transmits a message to the packet processing intermediary, indicating that the virtualized run-time environment is unable to process the encapsulated packet.

20 Claims, 10 Drawing Sheets

System 100

(56) References Cited

U.S. PATENT DOCUMENTS

| | | | | |
|---|---|---|---|---|
| 2014/0372788 | A1* | 12/2014 | Vavrick | G06F 9/45558 714/4.1 |
| 2015/0092551 | A1* | 4/2015 | Moisand | H04L 67/146 370/235 |
| 2015/0154046 | A1* | 6/2015 | Farkas | G06F 9/45558 718/1 |
| 2015/0172104 | A1* | 6/2015 | Brandwine | H04L 41/0681 709/224 |
| 2016/0127509 | A1* | 5/2016 | Uriel | G06F 9/45558 709/203 |
| 2016/0188413 | A1* | 6/2016 | Abali | G06F 9/45558 718/1 |
| 2016/0315802 | A1* | 10/2016 | Wei | H04L 41/0686 |
| 2016/0373345 | A1* | 12/2016 | Li | H04L 12/4641 |
| 2017/0295082 | A1 | 10/2017 | Wu et al. | |
| 2018/0123943 | A1* | 5/2018 | Lee | H04L 45/28 |
| 2020/0028785 | A1* | 1/2020 | Ang | G06F 9/45558 |
| 2021/0105178 | A1* | 4/2021 | K | H04L 41/344 |
| 2023/0035375 | A1* | 2/2023 | Tang | H04L 43/028 |
| 2023/0254243 | A1* | 8/2023 | Vysotsky | H04L 45/02 370/389 |
| 2024/0251010 | A1* | 7/2024 | Chen | G06F 9/45558 |

* cited by examiner

Technique A: Local health monitoring messages initiated by NVM

Technique B: Virtual-machine-initiated "busy" notifications to NVM

ACCELERATING REMEDIAL ACTIONS FOR NETWORK TRAFFIC OF UNRESPONSIVE VIRTUAL MACHINES

BACKGROUND

In recent years, more and more applications are being run using virtual machines established at computing services of cloud provider networks. Thousands of such virtual machines may be used to run the business logic of different applications concurrently, with application workloads being distributed using load balancers among a group of target virtual machines implementing the business logic of a given application. In some cases, client requests directed to the applications may originate at other virtual machines of the cloud. Virtual machines may occasionally become unresponsive to application requests for a variety of reasons, even though the servers on which the virtual machines are running may remain operational. Service-level agreements of the applications run in large-scale virtualization environments may require responses to application requests to be provided quickly.

Figure 1:
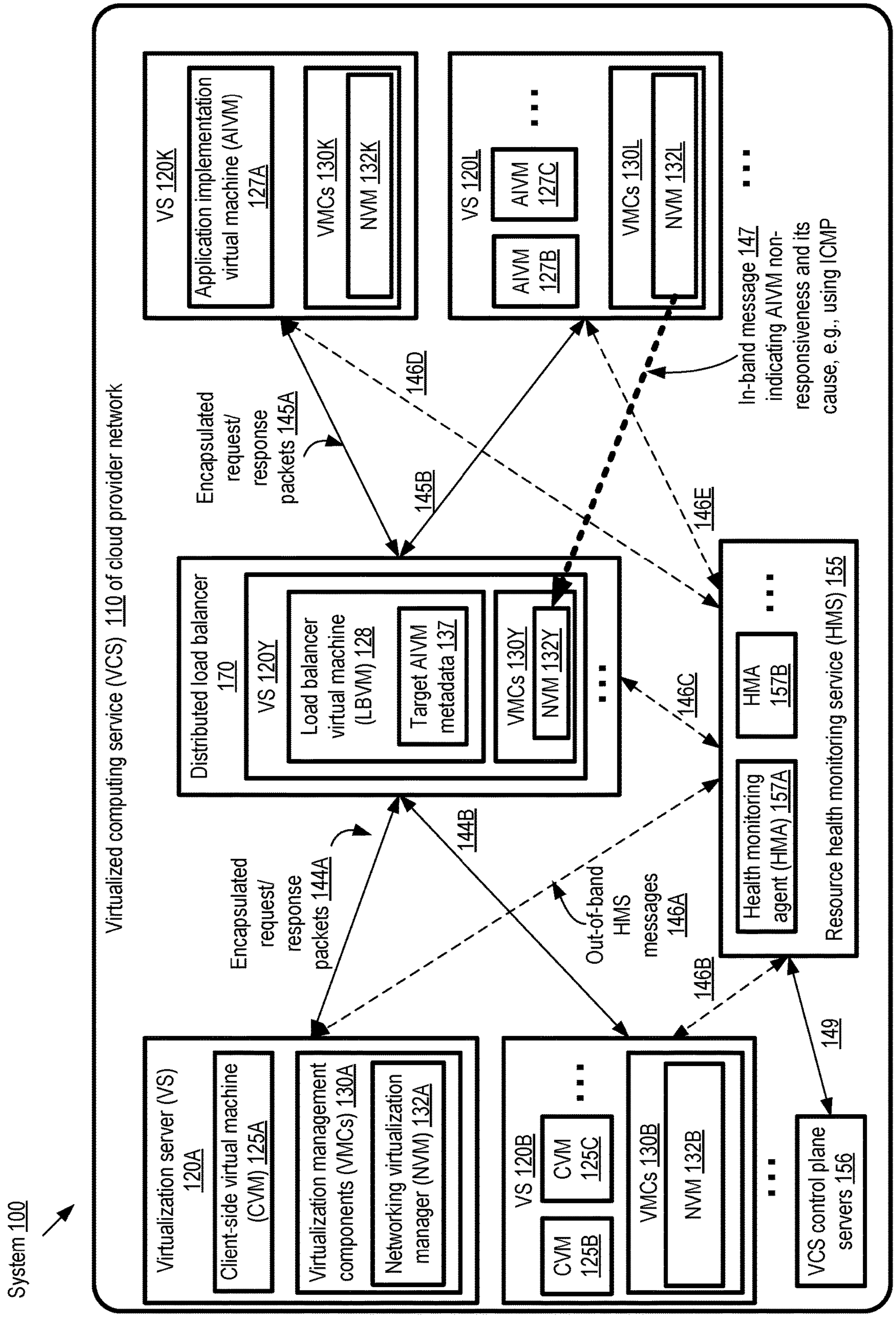
FIG. 1 illustrates an example system environment in which networking virtualization managers at virtualization servers of a computing service may use in-band messages to accelerate remedial networking actions after detecting unresponsive virtual machines, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for reducing the time taken for remedial actions when virtual machines implementing an application or service at virtualization servers of a cloud provider network are unable to respond to requests sufficiently quickly, for example because the virtual machines are temporarily overloaded or because the virtual machines have terminated execution even though the underlying virtualization servers remain operational. Typically a health monitoring service (HMS) of the cloud provider network is responsible for monitoring the responsiveness of various cloud components including the virtual machines by sending heartbeat messages to the components and tracking the timeliness of responses to such heartbeat messages. In large scale cloud computing environments, hundreds of thousands of virtual machines can run concurrently, so heartbeat messages can collectively end up consuming a substantial portion of the networking bandwidth available if the messages are sent too frequently. The rate at which heartbeat messages are transmitted can therefore be restricted, but this has the unfortunate side effect that it takes longer to detect unresponsive components, and therefore to take corresponding remedial actions (such as resetting connections or modifying load balancer configurations to direct subsequent application requests to different targets). Responses to application requests often have to be provided with very low latencies on average, based on the service level agreements of the applications, so performing remedial actions as quickly as possible becomes highly desirable.

To help alleviate the problem of potentially-delayed remedial actions in cloud-based virtualized computing environments, networking virtualization managers (NVMs) can play an important role. Each virtualization server (VS) used for one or more virtual machines at a virtualized computing service (VCS) of a cloud computing environment or cloud provider network can comprise virtualization management components (VMCs) including an NVM. The NVM participates in the implementation of an encapsulation protocol of the VCS, whereby network packets whose source and destination addresses (assigned to virtual machines) belong to address ranges of virtual networks are encapsulated within packets transmitted using an underlying physical or substrate network connecting the VSs at which the virtual machines run. As such, an NVM at a given VS can act as a necessary packet transmission intermediary or packet processing intermediary for inbound network packets directed from entities outside the VS to a virtual machine running at the VS, and also for outbound network packets directed from the virtual machine to entities outside the VS. A number of techniques can be used by an NVM to quickly determine, without using the networking resources used by an HMS, whether a timely response can be provided by a given virtual machine at the same host to a packet received at the NVM and directed to that virtual machine. For example, the NVM can implement a local heartbeat mechanism, which does not consume network bandwidth, to monitor the responsiveness of a virtual machine, or the virtual machine can proactively notify the NVM that the workload level of the virtual machine is too high for the virtual machine to process new incoming messages at least temporarily.

In response to determining that the targeted virtual machine is unable to process an inbound packet, the NVM can transmit an in-band message as an indicator of unresponsiveness of the targeted virtual machine to a device (such as a load balancer or other packet processing intermediary) from which the inbound packet was received. The in-band message can be considered a special type of response to the received inbound packet, indicating that the target virtual machine to which the inbound packet was directed cannot process the inbound packet (or is unlikely to be able to process the inbound packet within a desired timeframe or time constraint). As used herein, the term “in-band message” or “in-band packet” refers to a message that is sent in response to another message transmitted along a path used for communication between a client-side component of an application and a server-side component of the application. In contrast, the term “out-of-band message” or “out-of-band packet” refers to a message that is initiated independently (e.g. by an HMS to check responsiveness of a virtual machine, or by an HMS to notify a load balancer that one of the load balancer's target virtual machines appears to be unresponsive) without receiving a corresponding triggering message from a client-side component or a server-side component of the application. In some cases, a communication session may be established between the client-side component and the server-side component, and messages sent as part of the session may be referred to as in-band messages, while messages that are not part of the session may be referred to as out-of-band messages with respect to that session. In response to the in-band message, the sending device can then quickly initiate any of a variety of remedial actions, such as causing a currently-established network connection used for the inbound packet to be reset and a replacement connection to be established, updating load balancer configuration information to enable subsequent packets from an application client to be directed to a different target virtual machine (so that additional packets are not sent to the same unresponsive target virtual machine), modifying load balancing algorithm parameters to reduce the likelihood of subsequent packets being sent to the unresponsive target for at least some time period, and so on. Such remedial actions can be initiated by the sending device without having to wait for asynchronous out-of-band notifications of the impaired responsiveness of the target virtual machine from an HMS. Note that the HMS can continue its normal operations using out-of-band notifications in scenarios in which in-band notifications of unresponsive virtual machines are provided by NVMs; from the perspective of load balancers and other sending side devices, such out-of-band notifications can serve as additional sources of information about the state of the targeted virtual machines. In scenarios in which the targeted virtual machine becomes responsive after a period of unresponsiveness, out-of-band HMS notifications can inform the sending device of the recovery of the targeted virtual machine, and the sending device can take additional actions in response. In some cases, the frequency of out-of-band messages used for monitoring virtual machines can be reduced further in scenarios in which NVMs are used as described above, thereby reducing the overhead associated with monitoring virtual machines by an HMS.

In many cases, the inbound messages directed to the target virtual machine may originate at other virtual machines; that is, both client-side and server-side portions of applications can be implemented using virtual machines of the cloud provider network. Virtual machines from which requests for a service or application are sent can be referred to as client-side virtual machines (CVMs), while virtual machines at which the logic of the service or application is implemented to process the requests can be referred to as application implementation virtual machines (AIVMs) or server-side virtual machines (SVMs). The virtual machines can also be referred to as compute instances. The VSs at which CVMs of an application or service are run can be referred to as source servers in some embodiments, while the VSs at which the AIVMs of the application run may be referred to as target servers. A load balancer can be established at the VCS to distribute incoming application requests among a group of target AIVMs as indicated above; such a load balancer can itself include one or more virtual machines launched at a set of VSs. In scenarios in which packets directed to a target AIVM originate at a CVM and are distributed to the target AIVM by a load balancer implemented at a VS, respective NVMs at the source VS (where the CVM is run), the load balancer VS, and the destination VS (where the target AIVM runs) can all implement the encapsulation protocol of the VCS. An in-band message indicating an unresponsive compute instance can be transmitted initially from the destination VS's NVM to the load balancer's NVM, and a similar in-band messages can then be transmitted from the load balancer's NVM to the source VS's NVM.

A protocol such as ICMP (the Internet Control Message Protocol) or an equivalent control information protocol can be used to send the in-band notifications. In such a scenario, a portion of the in-bound packet (for which a timely response was unavailable) may be included in the in-band notification message or packet; this can for example help the receiver of the in-band notification identify the particular packet flow for which responsiveness has been affected. Because the NVMs are designed and implemented at the cloud provider network, ICMP codes or other fields can be used in a customized manner to (for example) indicate a probable reason or cause (as determined/estimated at the NVM of the VS of the target virtual machine) why the target virtual machine is unresponsive—e.g., whether the target virtual machine has terminated or exited execution, or whether the targeted virtual machine's workload level is currently so high that it cannot respond to additional packets. Depending on the reason, different types of remedial actions can be taken—for example, if the targeted virtual machine is overloaded, an attempt to send additional messages (or the same message again) to it can be deferred temporarily, while if the targeted virtual machine is no longer running, a connection can be established to a different virtual machine for subsequent messages.

As one skilled in the art will appreciate in light of this disclosure, certain embodiments may be capable of achieving various advantages, including some or all of the following: (a) reducing the average latencies for client requests directed to services or applications run using virtual machines of a cloud computing environment, e.g., by responding more quickly to unresponsive resources being used for the services or applications being used, and/or (b) reducing the amount of networking bandwidth used for monitoring resources in cloud computing environments.

According to some embodiments, a system may comprise a set of target servers of a VCS of a cloud computing environment, a load balancer and an HMS of the cloud computing environment. The load balancer may be established to distribute network packets among a set of target virtual machines of the VCS. Individual servers of the set of servers may comprise a respective NVM and a respective target virtual machine of the set of target virtual machines. The HMS may be configured to, in response to determining, using a health monitoring algorithm (such as a heartbeat-based algorithm which uses out-of-band messages to check responsiveness), that a target virtual machine of the set of target virtual machines is unresponsive, provide a notification of the detection to the load balancer and/or to other devices in the network. An NVM at a particular server of the set of servers may be configured to receive an encapsulation packet from the load balancer, formatted in accordance with an encapsulation protocol of the VCS. The NVM may determine that the encapsulation packet comprises an encapsulated packet directed to a first target virtual machine which was launched at the particular server. The NVM may further determine, without communicating with the HMS in various embodiments, that the first target virtual machine is unable to process the encapsulated packet.

In response to determining that the first target virtual machine is unable to process the encapsulated packet, the NVM may transmit an in-band message to the load balancer, indicating that the first target virtual machine is unable to process the encapsulated packet. The in-band message may serve as an unresponsiveness indicator or an error indicator in various embodiments. Note that the NVM may be able to distinguish between several kinds of unresponsiveness of the target virtual machine in different embodiments—in some cases, the target virtual machine may simply be too busy to respond within a desired time constraint, while in other cases the target virtual machine may no longer be running, even though the virtualization server itself (at which the NVM runs) remains up. In at least some embodiments, the in-band unresponsiveness indicator message may comprise a portion of content of the encapsulation packet which was received at the NVM, e.g., thereby enabling the load balancer to determine the specific encapsulation packet or packet flow with respect to which the in-band notification message was generated. The load balancer may be configured to store metadata in response to the in-band message, indicating that additional packets directed to the first target virtual machine are not to be sent from the load balancer to the first server. The metadata may be stored without receiving an out-of-band notification, indicating unresponsiveness of the first target virtual machine, from the HMS in various embodiments.

In some embodiments, a load balancer may not necessarily be established for traffic between a client-side portion of an application (running at a virtual machine) and server-side portion (running at another virtual machine). In one such embodiment, the notification of the unresponsiveness of the target server-side virtual machine may be sent by the NVM associated with the target to a packet transmission intermediary other than a load balancer, e.g., to an NVM at the server at which the client request originates. In at least one embodiment, the client-side and/or server-side components of an application or service may comprise virtualized run-time environments (VRTEs) other than virtual machine or compute instances, such as software containers. Software containers, virtual machine and compute instances may thus all be considered examples of VRTEs in various embodiments.

According to one embodiment, a field within the in-band response indicating unresponsiveness of a VRTE may include a value may indicate a probable reason or cause (as deduced/estimated by the NVM sending the in-band response) as to why the VRTE is unresponsive to the received encapsulated packet. For example, one value in the field may indicate that the VRTE has terminated execution, another value may indicate that a workload level of the VRTE prevents the VRTE from processing the received packet, and a third value may indicate that a request rate throttling parameter presents the VRTE from processing the received packet. In at least one embodiment, the NVM at the server at which the target VRTE runs may receive an indication from the target VRTE that the workload level of the VRTE is too high for it to be able to process additional inbound messages at least temporarily, or that a throttling parameter setting prevents the target VRTE from processing additional inbound messages. In at least one embodiment, the notification generated by the NVM at the server at which the target VRTE was launched may be formatted in accordance with a version of ICMP. A code field of the IVM message may be used to indicate the reason/cause for unresponsiveness of the target VRTE in such an embodiment. Note that ICMP may also be used to notify client-side components when other types of networking-related failures or delays occur in the system—e.g., if the target VS at which the target VM runs crashes or goes offline (and/or the NVM at the target VS becomes unavailable), different kinds of ICMP messages may be sent by other networking intermediaries such as routers or switches along the pathway being used for client-to-server communication to the client-side components.

In some embodiments, a connection-oriented protocol such as TCP (Transmission Control Protocol) may be used for communication between a client-side VRTE and the target VRTE. In such an embodiment, one of the actions triggered by the detection of unresponsiveness may include causing one or more network connections which were being used for the communication between the client-side VRTE and the target VRTE to be reset. A request to reset such a connection may be sent, for example, from an NVM of the server at which the target VRTE runs directly to an NVM of a different server of the VCS at which the client-side VRTE runs (the VRTE at which the encapsulated packet originated). In one embodiment, a connection reset request may be sent from a load balancer to an NVM of the server from which the encapsulation packet directed to the unresponsive VRTE was received. In another embodiment, two connections may be reset after the unresponsiveness of the target VRTE is detected-one connection between the target VRTE's NVM and an intermediary such as a load balancer, and another connection between the intermediary and the server at which the encapsulation packet was generated at the client side. In other embodiments, a connectionless protocol such as UDP (User Datagram Protocol) may be used. In such an embodiment, upon being informed that a target VRTE is unresponsive, a load balancer or similar packet processing intermediary may simply update its metadata regarding available targets, and send subsequent packets originating at the client-side VRTE (in encapsulated form) to a different target VRTE.

According to some embodiments, at some point after a given target VRTE is found to be unresponsive, e.g., either by an NVM running at the same virtualization server or by an HMS, the target VRTE may recover and be able to respond to new messages (e.g., if a high workload level was the cause of the unresponsiveness, the workload level may decrease). In such a scenario, in some embodiments the NVM and/or the HMS may in turn notify a load balancer or packet transmission intermediary from which the encapsulated packet was received earlier that the target VRTE is again available for messages. In at least one embodiment, an out-of-band message may be sent by the NVM to the intermediary to notify the intermediary regarding the resumption of availability of the target VRTE. The intermediary may then take additional actions (such as modifying load balancer metadata to indicate that the target VRTE can be used for subsequent messages from client-side VRTEs) in response to such a notification.

As mentioned above, the techniques introduced above may be implemented at least in part using resources of a cloud provider network or cloud computing environment in various embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters its primary data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN (virtual private network) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may also include edge locations in some embodiments, at which for example client-side VRTEs and/or server-side VRTEs may be executed. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as a VCS extension resource group. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices, antennas or other telecommunication equipment, and/or workloads.

As mentioned above, some cloud provider networks may provide support for local zones, a type of infrastructure deployment that places some of the provider network's compute, storage, database, and other select services close to large population, industry, and IT (information technology) centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or network-accessible services, which may include a VCS, a radio-based application management service (RBAMS) for some types of telecommunication applications, data processing service(s) (e.g., map reduce, data flow, and/or other large scale data processing techniques), data storage services (e.g., database management services, object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a VCS or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, NFAs or other accelerators), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable VS for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Containers and compute instances/VMs may both represent examples of program execution environments or VRTEs. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which networking virtualization managers at virtualization servers of a computing service may use in-band messages to accelerate remedial networking actions after detecting unresponsive virtual machines, according to at least some embodiments. As shown, system 100 may comprise resources and artifacts of a VCS 110 of a cloud provider network, including virtualization servers (VSs) used to run client programs of an application or service, other VSs used to implement the application, intermediary packet processing devices such as a distributed load balancer, a resource health monitoring service (HMS), and a set of control plane or administrative servers. In the depicted embodiment, VSs 120K and 120L may be used to run a group of application implementation virtual machines (AIVMs), such as AIVM 127A at VS 120K and AIVMs 127B and 127C at VS 120L. The AIVMs may run business logic or server programs of the application, and may therefore also be referred to as server-side VMs. Other virtualization servers, such as VS 120A and VS 120B, may be used to run client programs of the application, such as client programs at client-side virtual machines (CVMs) 125A at VS 120A, CVM 125B at VS 120B, and CVM 125C at VS 120B. The term "client program," as used herein, refers to a program which sends requests for various types of tasks to a network-accessible application or service based on the requirements of a customer of the service, and in at least some cases receives responses to those requests (which may include results of the operations, indications as to whether the operations succeeded or not, etc.) from the network-accessible application or service.

A distributed load balancer 170 may be established to distribute application request packets originating at various CVMs among a set of target AIVMs. The load balancer 170 may itself comprise a set of virtual machines, referred to as load balancer virtual machines (LBVMs), including LBVM 128 running at a VS 120Y in the depicted embodiment. The LBVMs may implement any of a variety of load balancing algorithms to distribute the requests in different embodiments, such as least-recently-used (LRU) algorithms, random selection algorithms, shortest queue based algorithms, and the like. Target AIVM metadata 137 may be maintained at the LBVMs of the distributed load balancer, indicating for example the currently-available and responsive set of AIVMs, mappings between AIVMs and VSs, performance data regarding the AIVMs, and so on. Note that the load balancing actions performed may differ, depending on whether the application uses a connection-oriented protocol (such as TCP) or a connectionless protocol (such as UDP) to receive requests and send responses. If a connection-oriented protocol is being used, in at least some embodiment the load balancing algorithm may be used to select a target AIVM at the time of connection establishment at the request of a CVM, and subsequent packets from the CVM may be sent to the same target after the connection is established (so load balancing may be performed at a connection granularity rather than a request granularity or packet granularity). If a connectionless protocol is being used, in some embodiments the load balancer may use its load balancing algorithm for each packet received from a CVM, so a different target AIVM may in some cases be selected for different requests from the same CVM.

In the embodiment depicted in FIG. 1, individual ones of the VSs may include a set of virtualization management components (VMCs), such as VMCs 130A at VS 120A, VMCs 130B at VS 120B, VMCs 130Y at VS 120Y, VMCs 130K at VS 130K and VMCs 130L at VS 120L. Virtual machines may be launched at a VS by the VMCs, e.g., in response to commands received from VCS control plane servers 156. The commands may be issued by the control plane servers, for example, in response to launch requests submitted by clients of the VCS. The VMCs at a given VS may act as intermediaries between the VMs run at that VS and the hardware components of the VS and the networking components to which the VS is attached. VMCs may include several types of entities, such as virtualization controllers responsible for booting up the VS and/or its constituent VMs, and a network virtualization manager (NVM). An NVM may be responsible (among other networking tasks) for managing, using an encapsulation protocol discussed below in further detail, the transmission of packets among virtual network addresses assigned to the VMs via a physical network of the VCS. The physical network may be referred to as a substrate network. In the depicted embodiment, NVMs 132A, 132B, 132Y, 132K and 132L may run at VSs 120A, 120B, 120Y, 120K and 120L respectively.

When a packet comprising an application request is generated at a CVM of a particular VS, the NVM of that VS may incorporate the application request packet (referred to as the encapsulated packet) within a larger packet (referred to as an encapsulation packet) and send the larger packet to the distributed load balancer via the substrate network. This types of encapsulation may be employed because the VSs are assigned network addresses (typically not known to VCS customers) within the substrate network, while the CVMs and the AIVMs may be assigned virtual network addresses assigned by VCS customers on whose behalf the CVMs and the AIVMs are launched. The NVM of the load balancer may send another encapsulation packet (also containing the application request packet as its encapsulated packet) to an NVM at the VS at which the target AIVM runs. The NVM at the target AIVM's VS may examine the contents of the received encapsulation packet, determine the specific AIVM to which the encapsulated packet should be provided, and cause that AIVM to receive the encapsulated packet. An encapsulation protocol of the VCS 110, which defines the headers to be used for encapsulation packets, the manner in which the encapsulation packets are to be formatted, and so on, may be implemented by the NVMs. If/when a response to the application request is generated at the target AIVM, a similar encapsulation procedure may be employed in the reverse direction in the depicted embodiment: an encapsulated packet containing the response may be sent within an encapsulation packet from the target AIVM's NVM to the load balancer, and another encapsulation packet containing the response may be sent from the load balancer back to the VS at which the CVM runs. Encapsulated request/response packets 144A and 144B may thus flow between the client-side VSs and the distributed load balancer, while encapsulated request/response packets 145A and 145B may flow between the distributed load balancer and the VSs at which AIVMs of the application run.

A set of health monitoring agents (HMAs) 157, such as HMA 157A and HMA 157B, may be set up at the HMS 155 to track the health state of various components of the VCS in the depicted embodiment using a health management algorithm selected for the VCS. The HMAs may send out-of-band messages 146 (such as heartbeat messages) to the VSs and/or to individual VMs running at the VSs in some embodiments in accordance with the algorithm, and wait for responses to the out-of-band messages to try to ascertain whether a given VM or VS remains up and responsive. In some cases, if a component is found unresponsive (e.g., if timely responses are not received for N successive heartbeat messages, where N is a parameter), the HMS may notify a set of entities accordingly, also via out-of-band messages. For example, a distributed load balancer may be notified using out-of-band HMS messages if/when one of the target AIVMs becomes unresponsive, so that the target AIVM metadata 137 maintained at the load balancer can be modified. In the scenario shown in FIG. 1, out-of-band HMS messages 146A may flow between the HMS and VS 120A, out-of-band HMS messages 146B may flow between the HMS and VS 120B, out-of-band HMS messages 146C may flow between the HMS and VS 120Y, out-of-band HMS messages 146D may flow between the HMS and VS 120K, and out-of-band HMS messages 146E may flow between the HMS and VS 120L. The HMS may also notify the VCS control plane servers via messages 149 regarding detected unresponsive components in the depicted embodiment, which may cause the control plane servers to initiate responsive actions in some cases (such as attempting to restart or relaunch a virtual machine). In some cases the HMS may monitor VS responsiveness in addition to VM responsiveness—e.g., heartbeat messages may be sent to each VS to ascertain the responsiveness of the VS and its NVM, while additional heartbeat messages may be sent to individual VMs at each VS. Because the number of VSs and VMs may be extremely large in a VCS, the out-of-band message traffic associated with the HMS may consume a non-trivial fraction of network bandwidth if they are sent very frequently; accordingly, the rate at which the out-of-band messages used for ascertaining virtual machine health states are sent may be reduced to avoid overwhelming the network. However, making the HMS message rate too low may cause delays in identifying unresponsive components.

In the embodiment shown in FIG. 1, the NVM of a given VS may be able to determine fairly quickly, without consuming network resources, whether a given virtual machine at that VS is unresponsive. A number of techniques may be used to determine the responsiveness or unresponsiveness of the virtual machine, as discussed below in further detail; in some cases, for example, a local heartbeat-based algorithm may be used. When an encapsulation packet is received at an NVM 132 (e.g., at NVM 132L from the distributed load balancer 170), the NVM 132 may examine the contents of that encapsulation packet to identify or determine the specific AIVM to which its encapsulated packet is directed. If the NVM is also able to determine that the targeted AIVM is unable to process the encapsulated packet, the NVM may very quickly send an in-band message 147 to the source of the encapsulation packet (e.g., an NVM at the distributed load balancer) indicating that the targeted AIVM is not going to be able to respond. The in-band message may comprise an error code in some embodiments, and may thus be described as an in-band error response message. Determining that the targeted AIVM is not going to be able to process the encapsulated packet in a timely manner may not require any communication between the NVM (at the VS comprising the targeted AIVM) and the HMS. When the source of the encapsulation packet receives the in-band message, any of a variety of remedial or responsive actions the may be initiated quickly, also without communicating with the HMS in the depicted embodiment. Examples of the remedial actions may include, among others, causing target AIVM metadata to be modified such that additional packets are not sent to the unresponsive target AIVM, causing one or more network connections to be reset, and so on. Because the in-band notification of the inability of the target AIVM may often be provided in a shorter time period than it would have taken to receive similar information from the HMS, and corrective action may also be initiated more quickly, the clients of the application may be able to receive a better quality of service overall than if the HMS were the only source of unresponsiveness-related information used. Note that in many cases, a virtual machine may become unresponsive, while the VS at which the virtual machine runs (and its NVM) may remain operational and responsive in various embodiments. Scenarios in which the NVM (or the VS as a whole) becomes unresponsive may continue to be handled using the HMS and/or components of the substrate network (such as routers, switches etc.) in some embodiments.

In some embodiments in which both the in-band approach and the HMS-based approach are being used, it may sometimes be the case (e.g., due to network delays) that an HMS-provided out-of-band notification about a particular unresponsive VM is received at a packet processing intermediary such as a load balancer before an in-band message regarding the same unresponsive VM is received, although the probability of such a sequence of events is low. In such a scenario, the packet processing intermediary may initiate remedial actions based on the out-of-band notification, and the in-band notification may in effect confirm the unresponsiveness of the unresponsive VM. Similarly, in some cases an out-of-band notification regarding the unresponsiveness of a target VM may be received after the in-band notification regarding the same target VM, and the out-of-band notification may simply server as a confirmation that the target VM is indeed unresponsive.

According to at least some embodiments, a protocol such as ICMP may be used for sending the in-band notification to the distributed load balancer from the NVM of the target AIVM's VS. In one embodiment, an error code included within the ICMP error message may be used to provide additional information about the unresponsive AIVM—e.g., one value of the code may be used to indicate that the targeted AIVM appears to have exited or terminated execution, while another value of the code may be used to indicate that the targeted AIVM remains up but its workload level appears to be preventing it from responding in a timely fashion to encapsulate packets. In such an embodiment, different remedial actions may be triggered depending on the probable cause/reason indicated for unresponsiveness—e.g., if the targeted AIVM is too busy to respond, a TCP connection being used to communicate with it may be kept open and the encapsulated packet may be resent after some time, while if the targeted AIVM has exited, the connection may be reset. In addition to remedial actions related directly to traffic between the client-side and server-side components of an application or service, other types of remedial actions may also be initiated in some embodiments, depending on the reason for the unresponsiveness of the target AIVM—for example, if the AIVM has crashed, an attempt to restart it may be made by the VCS control plane, or a replacement AIVM may be launched.

In some embodiments, the NVM-based accelerated notifications of virtual machine unresponsiveness may be used in scenarios in which a load balancer is not being used. For example, connectivity may be established between a pair of virtual machines running at respective VSs, and a similar approach may be used, with the NVM at the receiving-side or destination-side VS informing the NVM at the sending-side or source-side VS about the unresponsiveness via an in-band message. The sending-side NVM may be considered another example of a packet processing intermediary for traffic flowing between virtual machines, which can be informed about unresponsive components to take remedial actions quickly, just as a load balancer may be considered an example of such a packet processing intermediary. NVMs may also be referred to as network function executors or network function execution managers in some embodiments.

Figure 2:
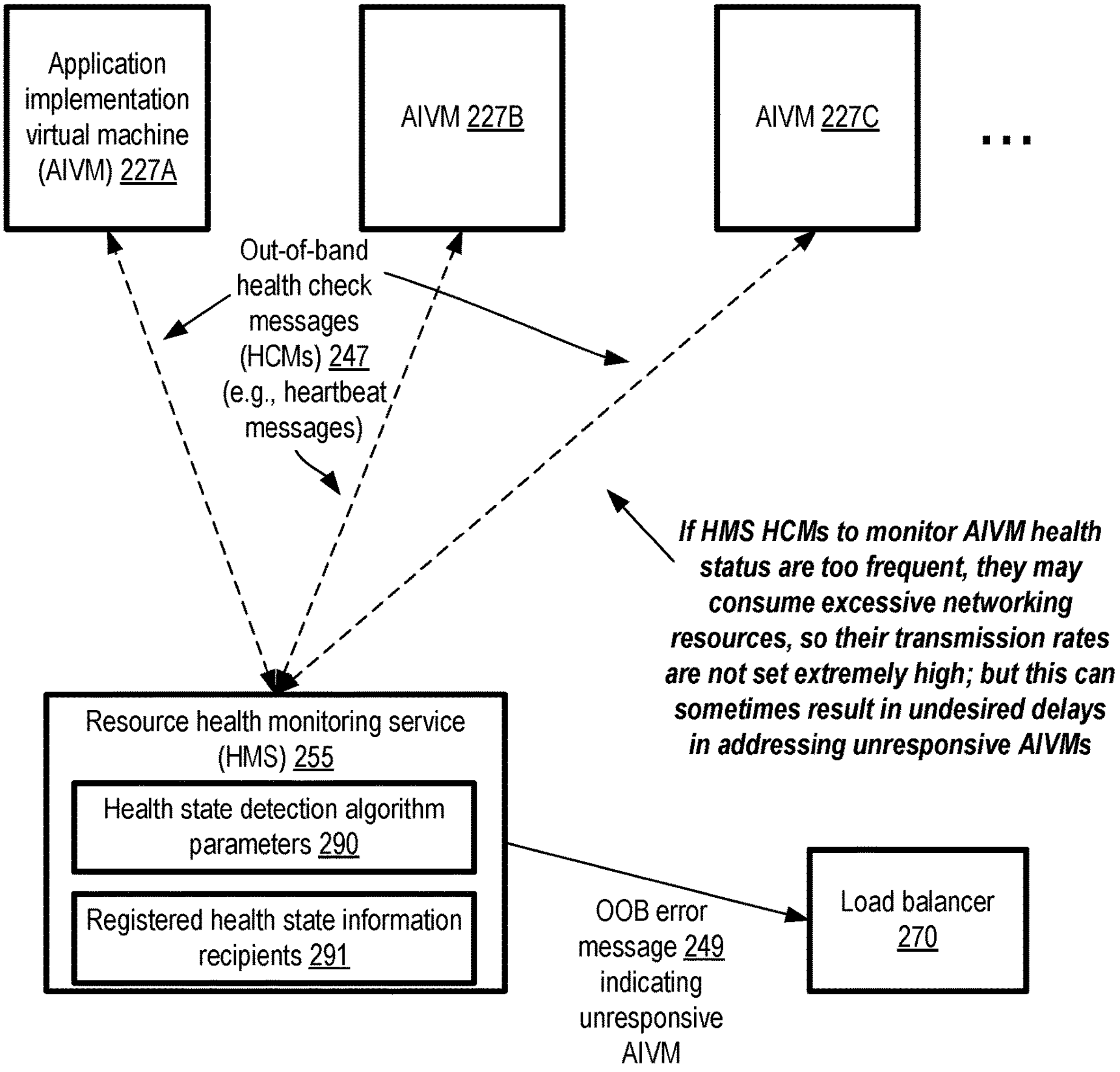
FIG. 2 illustrates an example scenario in which the use of a conventional monitoring service for detecting unresponsiveness may lead to undesirable application delays, according to at least some embodiments.

FIG. 2 illustrates an example scenario in which the use of a conventional monitoring service for detecting unresponsiveness may lead to undesirable application delays, according to at least some embodiments. In the depicted embodiment, a resource health monitoring service (HMS) 255 may periodically send out-of-band (OOB) health check messages (HCMs) 247 to each of numerous AIVMs of an application, such as AIVMs 227A, 227B and 227C. The recipient of an HCM may be expected to respond as soon as possible to the received HCM, thereby indicating that the recipient is in a healthy state. Health state detection algorithm parameters 290 may indicate how frequently the HCMs should be sent, the definition of unresponsiveness (e.g., a particular number of successive HCMs to which no timely responses are received), the format and protocol of the HCMs, whether any additional metadata such as work queue lengths is to be provided in the responses to HCMs from the AIVMs, and so on in the depicted embodiment.

Various authorized entities may be registered as recipients 291 of information about unresponsive AIVMs via OOB messages 249 in the depicted embodiment, including for example a load balancer 270 configured to distribute packets containing application requests from clients to the AIVMs. In some implementations, load balancers may be automatically registered to receive the unresponsiveness information when they are established at the VCS and/or when the set of targets of the load balancers changes.

If HMS HCMs used to monitor AIVM health status are too frequent, they may consume excessive networking resources (such as bandwidth), so their transmission rates may often not be set extremely high. However, making the HCMs too infrequent may sometimes result in undesired delays in addressing unresponsive VMs. In order to avoid such delays, NVMs may be used to send quick in-band notifications of unresponsive VMs in at least some embodiments as described in the context of FIG. 1.

Figure 3:
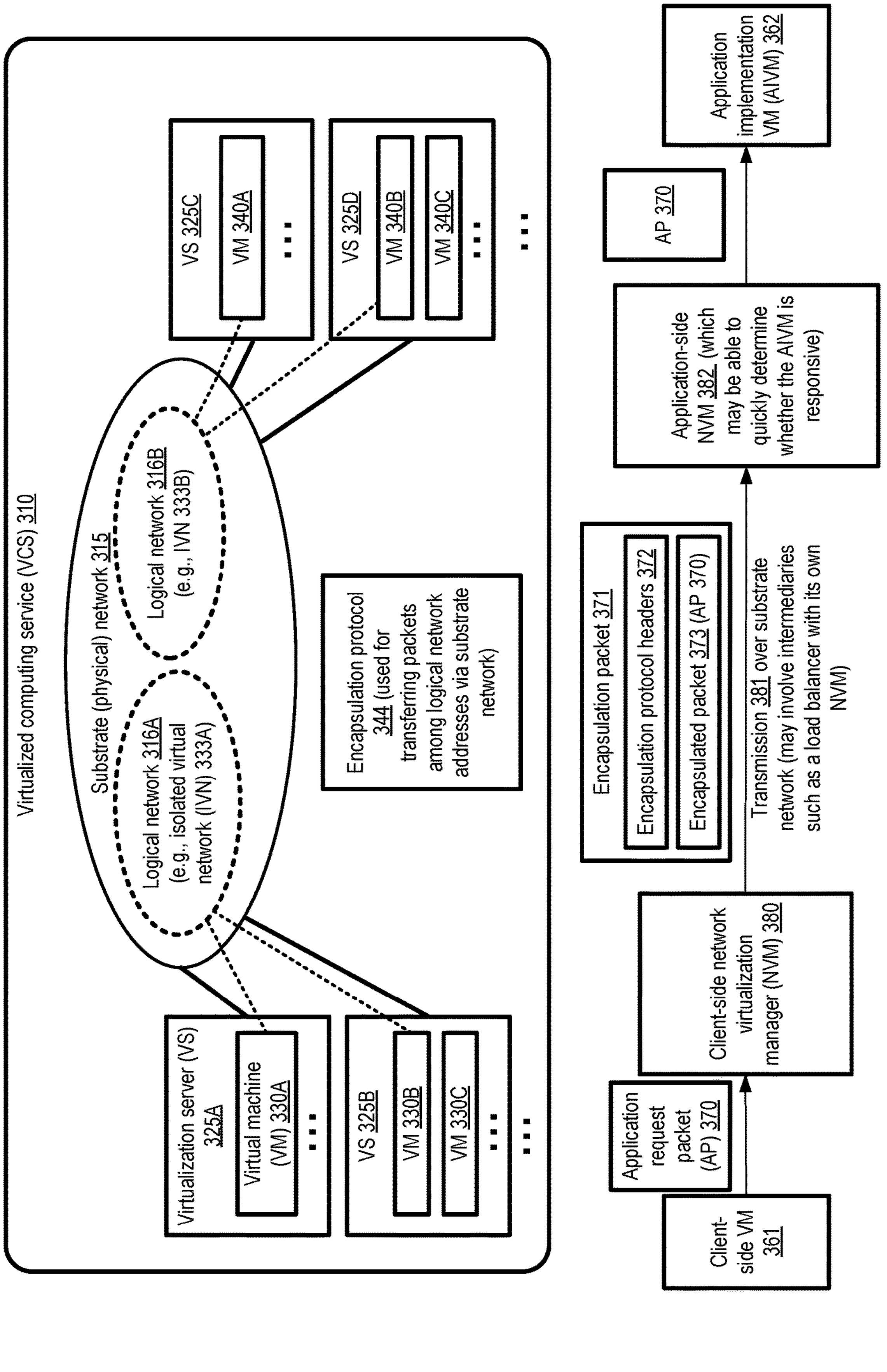
FIG. 3 illustrates the use of an encapsulation protocol for network traffic between virtual machines of a virtualized computing service, according to at least some embodiments.

FIG. 3 illustrates the use of an encapsulation protocol for network traffic between virtual machines of a virtualized computing service, according to at least some embodiments. In various embodiments, a VCS 310 may comprise a physical network, referred to as a substrate network 315, to which hardware servers used for the virtual machines, as well as various other devices (such as packet transmission intermediary devices including routers, switches, gateways, load balancers and the like) may be connected. Utilizing the substrate network as underlying infrastructure, logical networks may be configured in such embodiments on behalf of various VCS customers. For example, a set of virtual machines or compute instances may be launched on behalf of one customer C1 within a logical network called an isolated virtual network (IVN) 333A, while another set of virtual machines may be launched on behalf of a different customer C2 within another IVN 333B. IVN 333B may, for example, be used to implement the business logic of a network-accessible application, while requests directed to that application may be sent from client programs running in IVN 333A. An IVN (which may also be referred to as a virtual private cloud or VPC) may comprise a collection of networked resources (including virtual machines) assigned or allocated to a given customer, which are logically isolated from (and by default, inaccessible from) resources allocated for other customers in other isolated virtual networks. The customer on whose behalf an IVN is established may be granted substantial flexibility regarding network configuration for the resources of the IVN—e.g., private IP addresses for virtual machines may be selected by the customer without having to consider the possibility that other resources within other IVNs may have been assigned the same IP addresses, subnets of the customer's choice may be established within the IVN, security rules may be set up by the customer for incoming and outgoing traffic with respect to the IVN, and so on. In various embodiments, the network addresses assigned to virtual machines within an IVN may differ from the substrate network addresses assigned to the hardware servers on which the virtual machines run. An encapsulation protocol 344 and associated mapping service may be used to route the flows of network traffic within and across the IVNs (e.g., from one virtual machine to another) over the links and servers of the underlying substrate network in various embodiments. Virtualization management components such as NVMs may include the packets sent between addresses of the logical network address spaces within larger packets referred to as encapsulation packets, and send the encapsulation packets over the links of the substrate network using physical addresses of the virtualization servers (obtained from a service which maintains maps between logical addresses of the IVNs and substrate addresses of the virtualization servers)

In the scenario depicted in FIG. 3, virtual machines (VM) 330A of VS 325A and VM 330B of VS 325B may be configured within IVN 333A (logical network 316A), while VMs 340A of VS 325C and VM 340B of VS 325D may be configured within IVN 333B (logical network 316B). Note that in general, a given VS may be used to host virtual machines of any desired number of IVNs—e.g., VM 330C may be configured within a different IVN than VM 330B, and VM 340B may be configured within a different IVN than VM 340C.

A client-side VM 361 (such as VM 330A) may generate an application request packet (AP) 370 containing a request for an application task which is implemented at a set of virtual machines (such as VM 340A and VM 340B) within a different IVN in the depicted embodiment. The NVM at the client-side NVM 380 (running at the same VS as the client-side VM) may generate an encapsulation packet 371 comprising a set of encapsulation protocol headers 372 and the AP 370 as the encapsulated packet 373. The encapsulation packet may be transmitted over the substrate network to the VS at which a target AIVM 362 runs. The transmission 381 over the substrate network may utilize intermediaries such as a load balancer with its own NVM in some embodiments. An applications-side NVM 382 (running at the VS at which the target AIVM runs) may receive the encapsulation packet 371 and extract the encapsulated packet from it. The extracted encapsulated packet (AP 370) may then be provided to the AIVM 362. Because the application-side NVM 382 acts as a local packet processing intermediary for packets directed to the target AIVM, it may be able to very quickly determine whether the target AIVM is responsive or not. If the application-side NVM is able to detect that the target AIVM is not going to be able to respond to an application request in a timely manner, the application-side NVM can send an in-band error response to the client-side NVM (or to some other packet processing intermediary such as a load balancer from which an encapsulation packet was received) indicating that the target AIVM is unresponsive. In many cases, the in-band error response would in effect replace a different in-band response which would have been sent by the target AIVM if the target AIVM were responsive, so the overall consumption of network resources would not be increased substantially as a result of the sending of the in-band error response.

Figure 4:
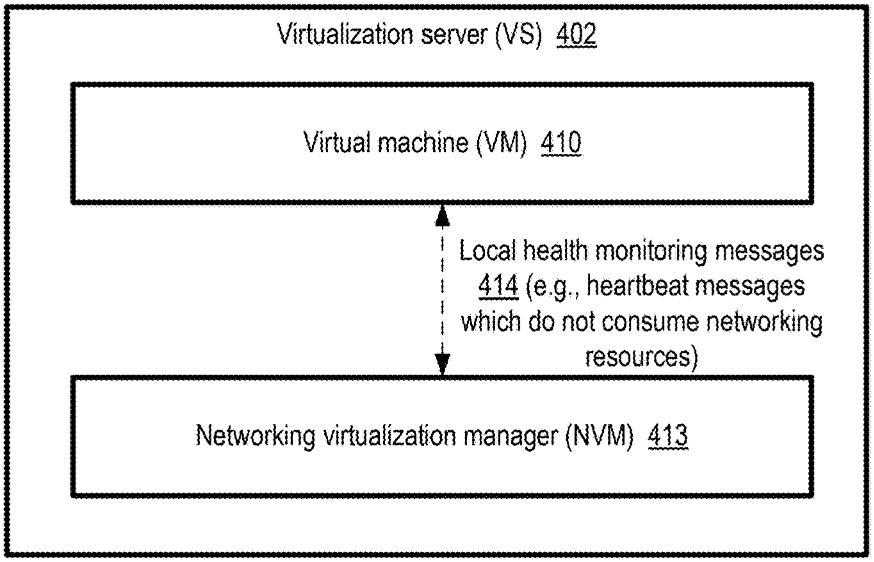
FIG. 4 illustrates example techniques enabling a networking virtualization manager of a virtualization server to determine that a virtual machine at the virtualization server will be unable to process a network message at least temporarily, according to at least some embodiments.
Figure 4:
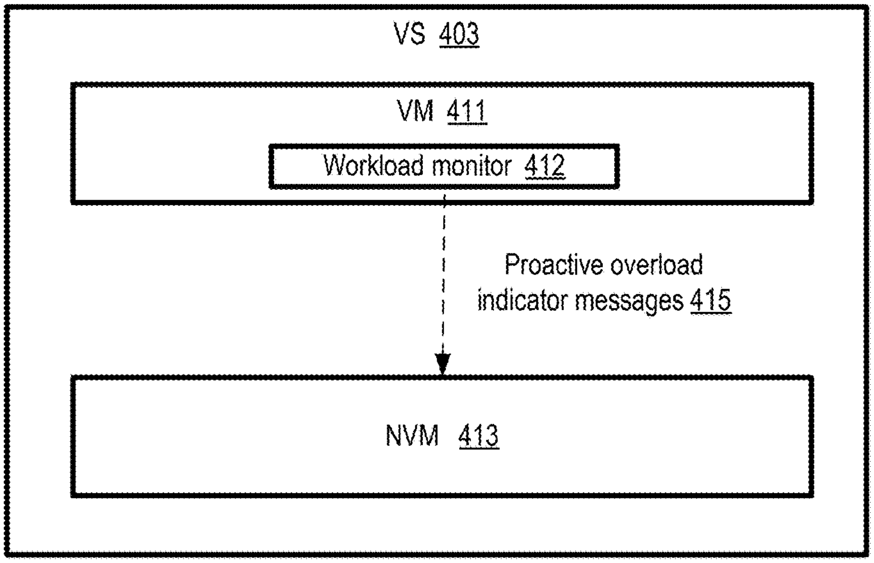

FIG. 4 illustrates example techniques enabling a networking virtualization manager 413 of a virtualization server to determine that a virtual machine at the virtualization server will be unable to process a network message at least temporarily, according to at least some embodiments. In Technique A, local health monitoring messages 414, such as heartbeat messages which do not consume networking resources may be sent from the NVM of a VS 402 to a virtual machine 410 running at the VS. The ability of the virtual machine to process network messages may be determined based on the responses received by the NVM to the local health monitoring messages. The health monitoring messages and their responses may be exchanged using a variety of local communication channels at the VS in different embodiments, such as message queues in memory. Because both the NVM and the virtual machine run at the same server, network links may not be required for the health monitoring messages. In some embodiments, the rate at which the local health monitoring messages are sent may be set substantially higher than the rate at which an HMS sends its own health monitoring messages to the virtual machine, thereby enabling the NVM to detect unresponsiveness of the virtual machine much quicker than the HMS can detect the unresponsiveness.

In Technique B, according to some embodiments, a virtual machine 411 running at a VS 403 may send proactive overload indicator messages 415 to the NVM 413 if/when the virtual machine's workload reaches a level that prevents the virtual machine from processing additional messages/packets in a timely manner. In one embodiment, the virtual machine 411 may comprise a workload monitor 412 (e.g., a privileged process) which keeps track of utilization levels and other metrics of the virtual machine, and initiates the sending of proactive overload indicator messages when appropriate via any of several types of communication channels to the NVM 413. Because the overload indicator messages can be sent as soon as the virtual machine reaches a threshold workload level, the subsequent unresponsiveness of the virtual machine to new messages may be detected even more quickly than if Technique A alone were used. In some embodiments, both Technique A and Technique B may be used to enable the NVM to quickly determine whether a virtual machine is going to be able to respond to a received message in a timely manner. In other embodiments, techniques other than those shown in FIG. 4 may be employed.

Figure 5:
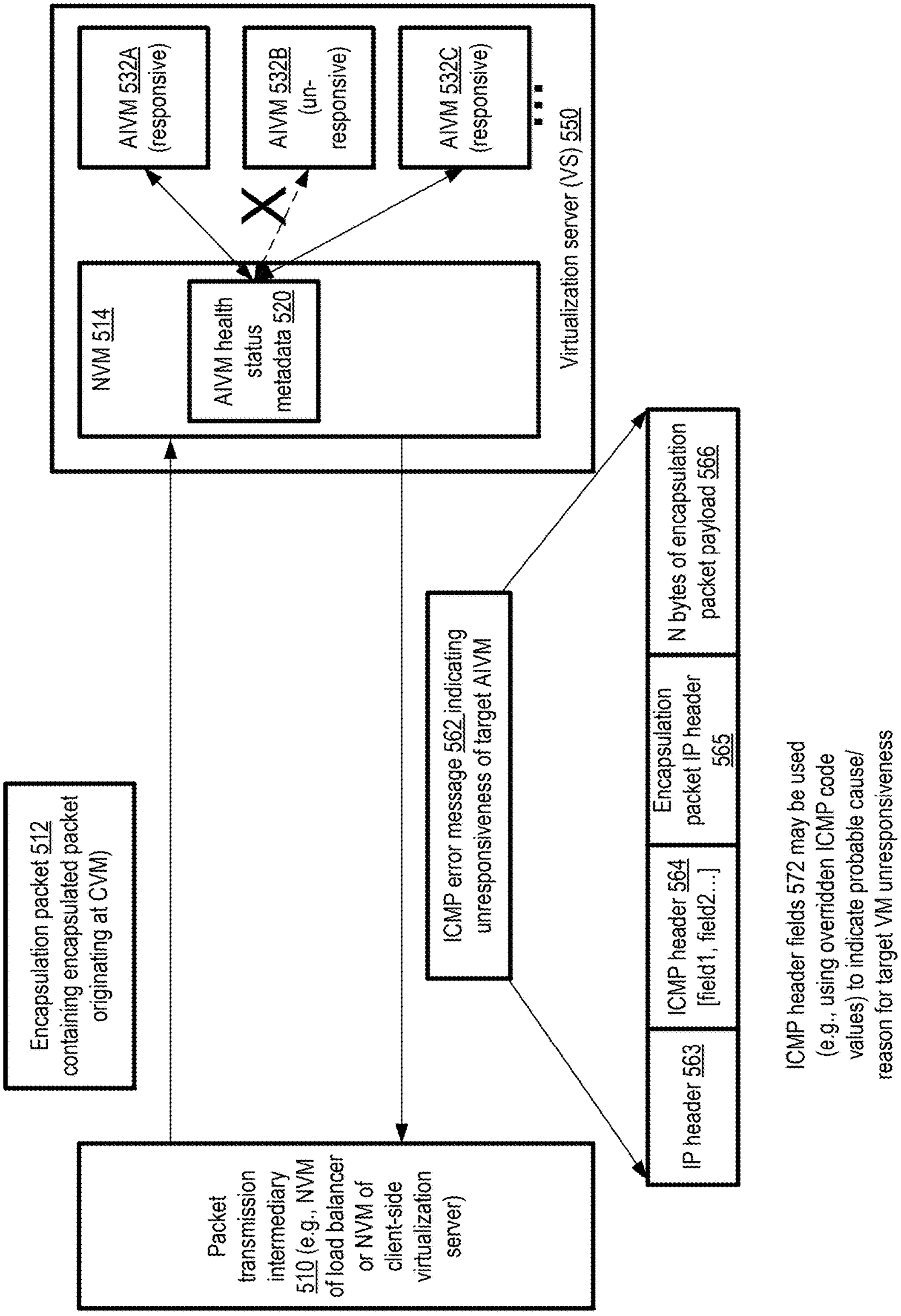
FIG. 5 illustrates an example use of the Internet Control Message Protocol (ICMP) by a networking virtualization manager to provide information about an unresponsive virtual machine, according to at least some embodiments.

FIG. 5 illustrates an example use of the Internet Control Message Protocol (ICMP) by a networking virtualization manager to provide information about an unresponsive virtual machine, according to at least some embodiments. In the embodiment shown in FIG. 5, a packet transmission intermediary 510 may send an encapsulation packet 512, containing an encapsulated packet which originated at a client-side virtual machine (CVM), to a VS 550. The packet transmission intermediary 510 may be an NVM of a load balancer in a scenario in which the workload of an application is being distributed by a load balancer; in other scenarios in which a load balancer is not being used, the packet transmission intermediary may for example comprise an NVM of a client-side VS at which the CVM runs.

An NVM 514 at the VS 550 may examine the encapsulation packet 512 and determine that the contained encapsulated packet is targeted to a particular application implementation virtual machine AIVM 532B which was launched earlier at the VS 550. The VS 550 may comprise several AIVMs in some embodiments, such as AIVM 532A, AIVM 532B and AIVM 532C. The NVM 514 may be able to quickly determine that AIVM 532B, the targeted AIVM, is not going to be able to process the encapsulated packet included in the encapsulation packet 512 in a timely manner. In some embodiments, the NVM 514 may store AIVM health status metadata 520, indicating which of the AIVMs (if any) at the VS 550 are currently responsive and which of the AIVMs (if any) are unresponsive. In the scenario shown in FIG. 5, AIVM 532B is unresponsive, while AIVMs 532A and 532C are responsive. Techniques such as those shown in FIG. 4 may be used to determine the responsiveness of the respective AIVMs by the NVM in some embodiments, and the metadata 520 may indicate the most recent status of each AIVM as ascertained by the NVM 514.

The NVM 514 may send an ICMP error message 562 to the packet transmission intermediary 510, indicating the unresponsiveness of the targeted AIVM 532B in the depicted embodiment. The ICMP error message may thus serve as an in-band unresponsiveness indicator. The ICMP error message 562 may comprise an IP header 563, an ICMP header 564, an encapsulation packet IP header 565, and N bytes of the payload 566 of the encapsulation packet in the depicted embodiment. The number of bytes of the payload (and which specific bytes of the payload) that are included may vary in different embodiments; in some embodiments, for example, the initial eight bytes of the payload may be included. One or more ICMP header fields 572 may be used (e.g., using overridden ICMP code values) to indicate a reason or probable cause for the unresponsiveness of the target AIVM in some embodiments, as discussed in further detail below. Using ICMP error messages may be beneficial in some embodiments because ICMP is already widely used within provider networks and the Internet, so the protocol is likely to be familiar to various networking devices configured at the provider network. In one embodiment, a protocol other than ICMP may be used, such as a proprietary protocol implemented within the provider network.

Figure 6:
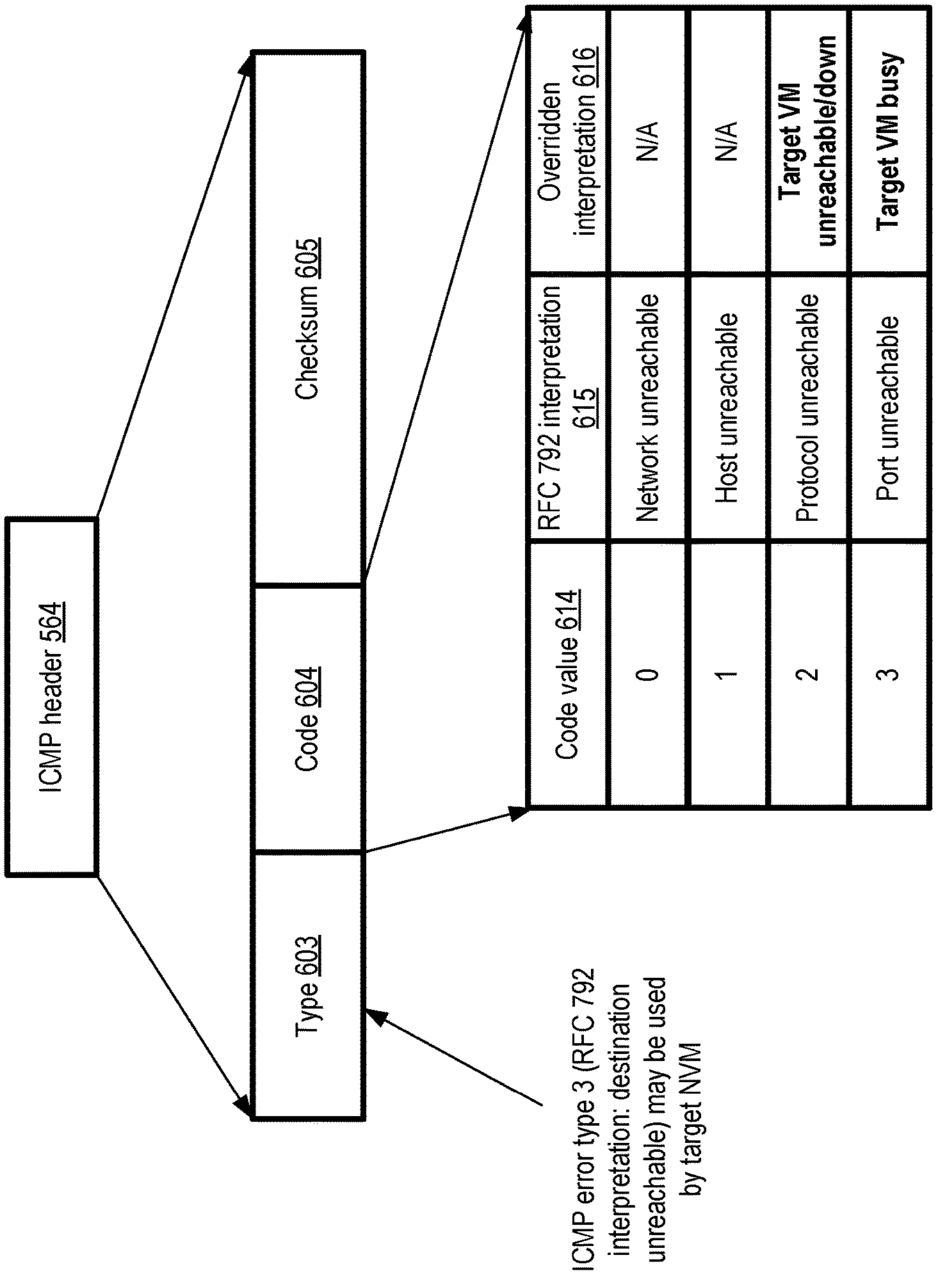
FIG. 6 illustrates an example use of ICMP error codes to provide information about a reason for unresponsiveness of a virtual machine, according to at least some embodiments.

FIG. 6 illustrates an example use of ICMP error codes to provide information about a reason for unresponsiveness of a virtual machine, according to at least some embodiments. As shown, an ICMP header 564 (included in an ICMP error message of the kind shown in FIG. 5) may comprise at least a type field 603, a code field 604, and a checksum field 605, e.g., in accordance with Internet Engineering Task Force (IETF) Request for Comments (RFC) 792. The ICM header may also include unused fields in some embodiments after the checksum 605.

The value "3" may be set for the type field 603 by the NVM sending the unresponsiveness indicator in some embodiments. According to RFC 792, the error value 3 is interpreted as "destination unreachable". Further detail about why the destination of the packet is unresponsive (i.e., a probable cause for the unresponsiveness) may be provided via the code field 604 in various embodiments. Four code values 614, and their RFC 792 interpretations 615, are shown in FIG. 6. According to RFC 792, code value "0" stands for "network unreachable", code value "1" stands for "host unreachable", code value "2" stands for "protocol unreachable", and code value "3" stands for "port unreachable". In at least some embodiments, one or more of these code values may be overridden in the ICMP error message generated by an NVM at the VS at which a target virtual machine has been identified as unresponsive. For example, the overridden interpretation 616 of the code "2" may be "target virtual machine unreachable or down" (instead of the default RFC 792 interpretation "protocol unreachable"), and the overridden interpretation of the code "3" may be "target virtual machine busy". The code value "2" may thus be interpreted by the recipient packet transmission intermediary of the ICMP error message as indicating that the target virtual machine of the encapsulated packet has exited/terminated execution, while the code "3" may be interpreted as indicating that the target virtual machine's workload level is currently too high for the encapsulation packet to be processed. Note that it may be acceptable to override the ICMP header code field in the manner indicated in FIG. 6 in various embodiments because the NVMs that send and receive the ICMP error message may be designed at, and therefore controlled fully by, the provider network operator, and the ICMP error messages indicating unresponsive VMs remain entirely within the provider network. If such ICMP error messages had to traverse network links and intermediaries external to the provider network, overriding the standard code interpretations may be more difficult. In some embodiments, other techniques may be used by an NVM to encode the reason(s) or probable cause(s) for the unresponsiveness of a targeted virtual machine.

Figure 7:
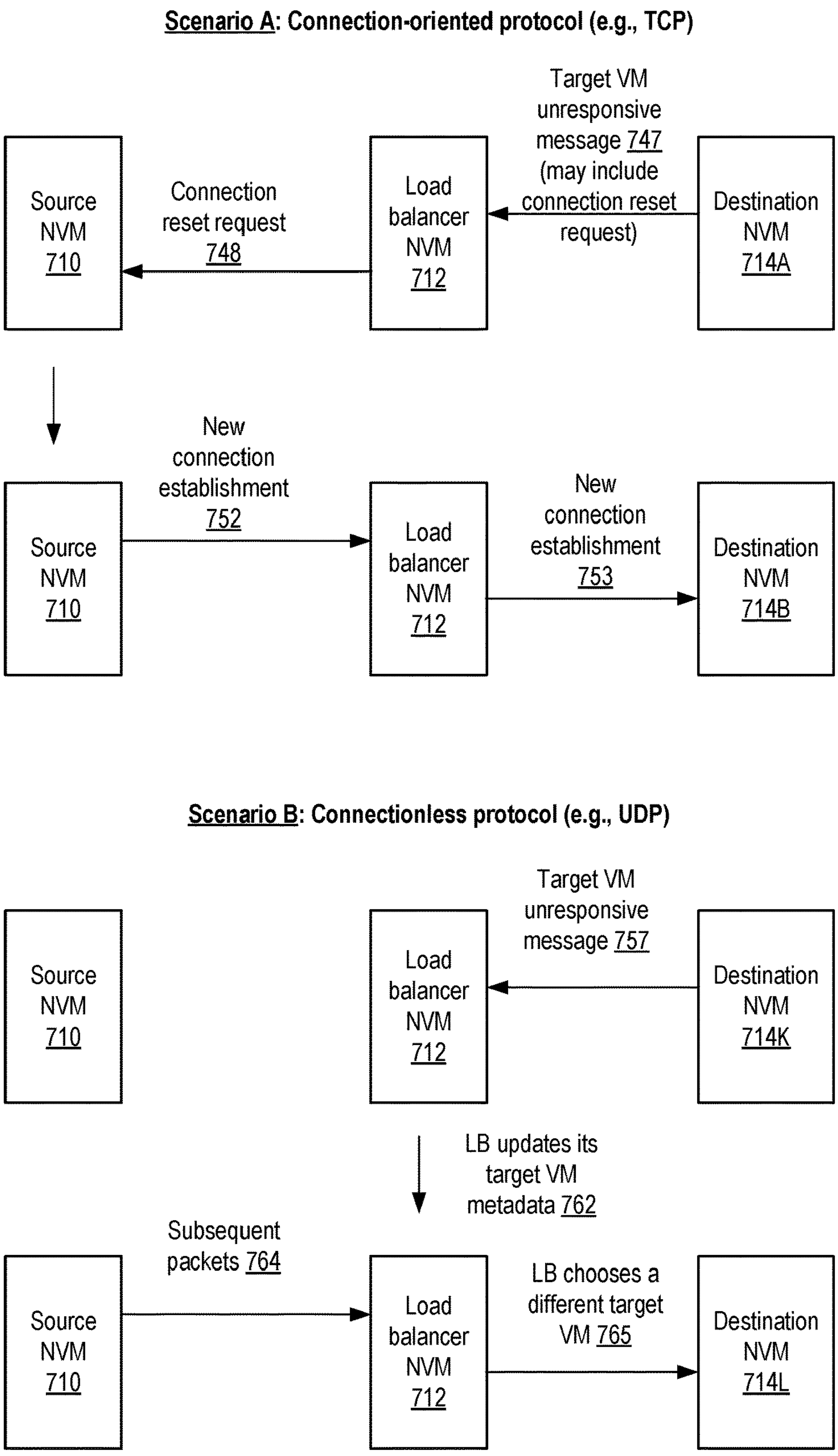
FIG. 7 illustrates example remedial actions which may be taken in response to a notification from a networking virtualization manager that a target virtual machine is unresponsive, according to at least some embodiments.

FIG. 7 illustrates example remedial actions which may be taken in response to a notification from a networking virtualization manager that a target virtual machine is unresponsive, according to at least some embodiments. In Scenario A of FIG. 7, a connection-oriented protocol such as TCP may be used for communication between the NVMs involved—e.g., a source NVM 710 (the NVM at a VS at which a client-side VM runs), a load balancer NVM 712, and a destination NVM 714A of a VS at which the target virtual machine selected for the traffic of the client-side VM runs. Upon determining that the target VM will not be able to respond to a received packet within a desired amount of time, the destination NVM may send a "target VM unresponsive" message 747 to the load balancer NVM 712. The load balancer NVM 712 may send a connection reset request 748 to the source NVM 710, requesting that the existing connection used for the encapsulation packets from the client-side VM be reset. The connection may be reset as requested, and the source NVM may send a new connection establishment request 752 to the load balancer NVM 712 in at least some embodiments. The new connection between the source NVM and the load balancer NVM may then be established and used for additional messages originating at the client-side VM. A new connection establishment request 753 may be sent by the load balancer to a destination NVM 714B of a VS at which a newly-selected target VM runs. In some embodiments, the message 747 may also include a connection reset request, or a separate connection reset request may be sent by the destination NVM 714A when it is determined that the target VM is unresponsive. In one embodiment, the destination NVM may send a connection reset request directly to the source NVM when the target VM is determined to be unresponsive. In some embodiments, the connections between the destination NVM and the load balancer NVM, and between the load balancer NVM and the source NVM, may only be reset if the target VM is detected as having terminated execution; in such an embodiment, of the target VM is unresponsive because its workload level is high, the connections may not be reset for at least some time interval to avoid the overhead of connection re-establishment.

In Scenario B of FIG. 7, a connectionless protocol such as UDP may be used. Upon receiving a "target VM unresponsive" message 757 from a destination NVM 714K, a load balancer's NVM may simply cause the load balancer (e.g., a set of compute instances implementing the load balancing algorithm) to update its target VM metadata 762, in effect removing the target VM at least temporarily from its list of available target VMs. When a subsequent packet 764 from a source NVM 710 of the VS where the client-side VM runs, directed to the application or service being implemented by the target VMs, is received (in encapsulated form) at the load balancer NVM, the load balancer VM at the VS at which the load balancer NVM runs may simply choose a different target VM 765 than the unresponsive target VM. The load balancer NVM 712 may then send an encapsulation packet comprising the newly-received packet from the client-side VM to the destination NVM 714L of the VS where the selected different target VM runs. Other actions may be initiated in some embodiments than those shown in FIG. 7 when an indication that a target VM is unresponsive is received at a load balancer NVM. For example, in one embodiment, one or more parameters of the load balancing algorithm being used may be modified, e.g., to reduce the probability that the unresponsive VM is chosen for subsequent packets. In at least some embodiments in which the indication of unresponsiveness which is received at a packet processing intermediary such as an NVM indicates the reason or cause for the unresponsiveness, a particular action may be selected and initiated by the packet processing intermediary based on the cause—that is, different actions may be selected based on the cause of the unresponsiveness.

Figure 8:
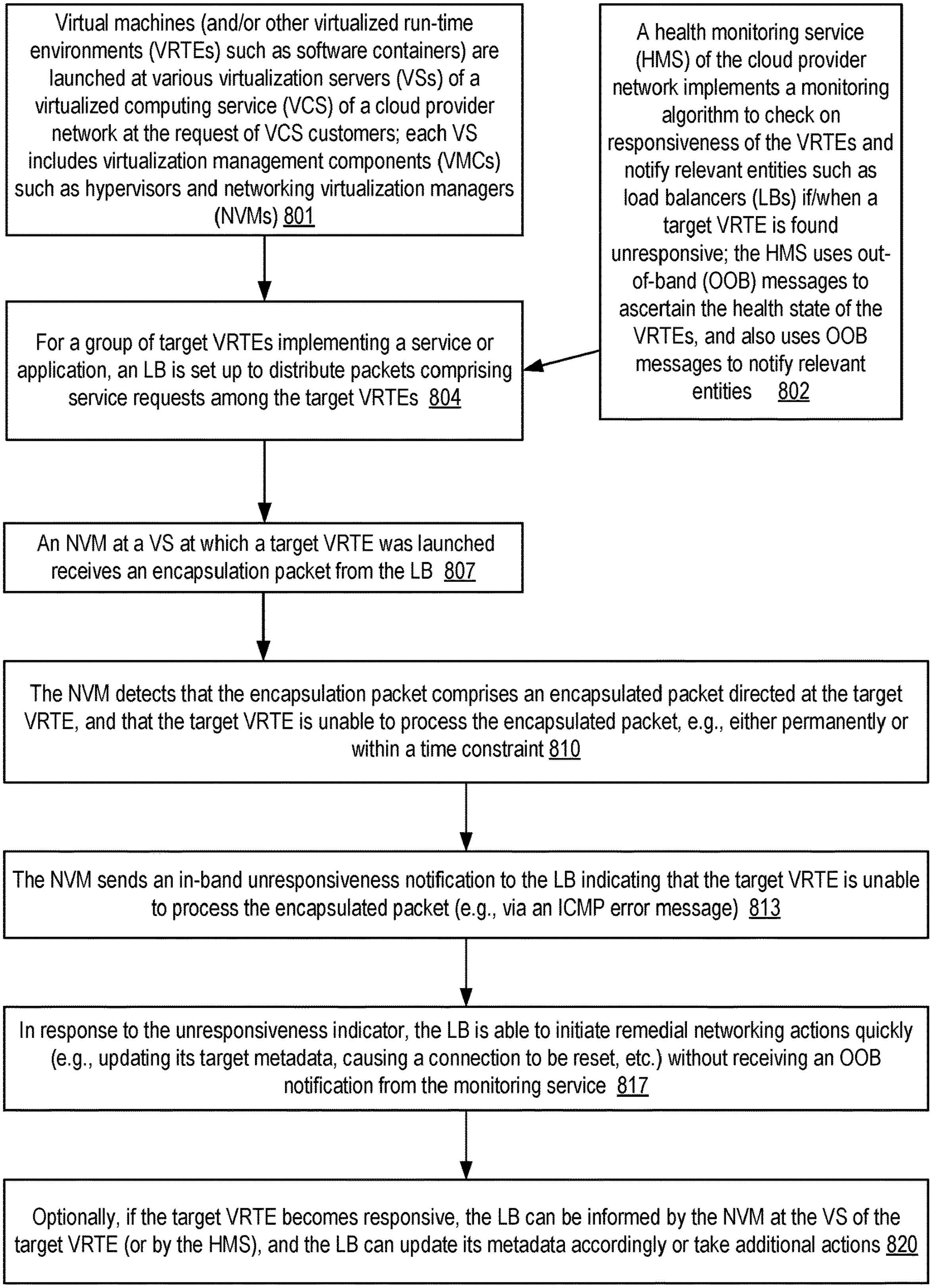
FIG. 8 is a flow diagram illustrating aspects of operations that may be performed, with the help of networking virtualization managers, to accelerate remedial actions for unresponsive virtualized run-time environments, according to at least some embodiments.

FIG. 8 is a flow diagram illustrating aspects of operations that may be performed, with the help of networking virtualization managers, to accelerate remedial actions for unresponsive virtualized run-time environments, according to at least some embodiments. As shown in element 801, a set of virtual machines (or other types of virtualized run-time environments (VRTEs) within which application client programs and business logic implementation programs can be run) may be launched at various VSs of a VCS of a cloud provider network in some embodiments. A given VS may comprise virtualization management components (VMCs) including a respective NVM. In at least some embodiments, the VMCs may include a hypervisor.

A health monitoring service (HMS) of the cloud provider network may implement one or more monitoring algorithms to check on the responsiveness and other health information of the VRTEs and other components of the provider network in various embodiments (element 802). The HMS may be responsible for notifying entities such as load balancers (LBs) of the cloud provider network if/when a target VRTE is found unresponsive in the depicted embodiment. In at least some embodiments, the HMS may use out-of-band messages such as heartbeat messages to detect or ascertain the health states of the VRTEs, and may also use out-of-band messages to notify the entities when unhealthy or unresponsive VRTEs are detected.

For a group of target VRTEs implementing a network-accessible service or application (e.g., an application designed by a customer of the cloud provider network and deployed at the VRTEs at the customer's request), an LB may be set up to distribute packets comprising service requests among the target VRTEs (element 804). As such, the LB may represent one example of a packet transmission intermediary for the application traffic. Depending on the kind of application or service being implemented, any of several different kinds of load balancers may be employed, such as network load balancers, application load balancers and the like. For some applications, requests and responses may be transmitted via connection-oriented networking protocols; for other applications, connectionless protocols may be used. The LB may receive notifications from the HMS if/when one or more of the target VRTEs is found to be unresponsive via the monitoring algorithm of the HMS in the depicted embodiment.

After an application implemented at a set of target VRTEs is activated, at some point an NVM at a VS at which a target VRTE was launched may receive an encapsulation packet from the LB in the depicted embodiment (element 807). The NVM may detect that the encapsulation packet includes an encapsulated packet directed at the target VRTE, and furthermore, that the target VRTE is unable to process the encapsulated packet either permanently or at least within a desired time constraint (element 810) in various embodiments. The fact that the target VRTE is unresponsive may be detected by the NVM without communicating with the HMS in at least some embodiments; that is, the HMS and its health monitoring algorithm may not be involved in the detection of unresponsiveness.

The NVM may send an in-band unresponsiveness indicator or notification to the LB, indicating that the target VRTE is unable to process the encapsulate packet in various embodiments (element 813). In some embodiments, an ICMP error message similar to that shown in FIG. 5 may be used as the unresponsiveness notification.

In response to the unresponsiveness indicator, in at least some embodiments, the LB can initiate remedial networking actions quickly (element 817), without having to receive an out-of-band notification regarding the unresponsive virtual machine from the HMS. A variety of remedial actions may be taken in different embodiments, such as storing metadata indicating that the LB is not to send additional encapsulated packets which are directed to the unresponsive VRTE to the VS at which the unresponsive VRTE was launched, causing one or more network connections used for the encapsulation packet to be reset and new/replacement connections to be set up, and so on.

Optionally, if/when the target VRTE (which was detected as being unresponsive) becomes responsive again, in some embodiments the LB may be informed of this (element 820), e.g., either by the NVM of the VS of the target VRTE, or by the HMS, or by both the NVM and the HMS. The LB may then update its metadata accordingly (e.g., by once again adding the target VRTE to the set of responsive targets to which the LB distributes application traffic) and/or take additional actions.

It is noted that in various embodiments, some of the operations shown in the flow diagrams of FIG. 8 may be implemented in a different order than that shown in the figure, or may be performed in parallel rather than sequentially. Additionally, some of the operations shown in FIG. 8 may not be required in one or more implementations.

Figure 9:
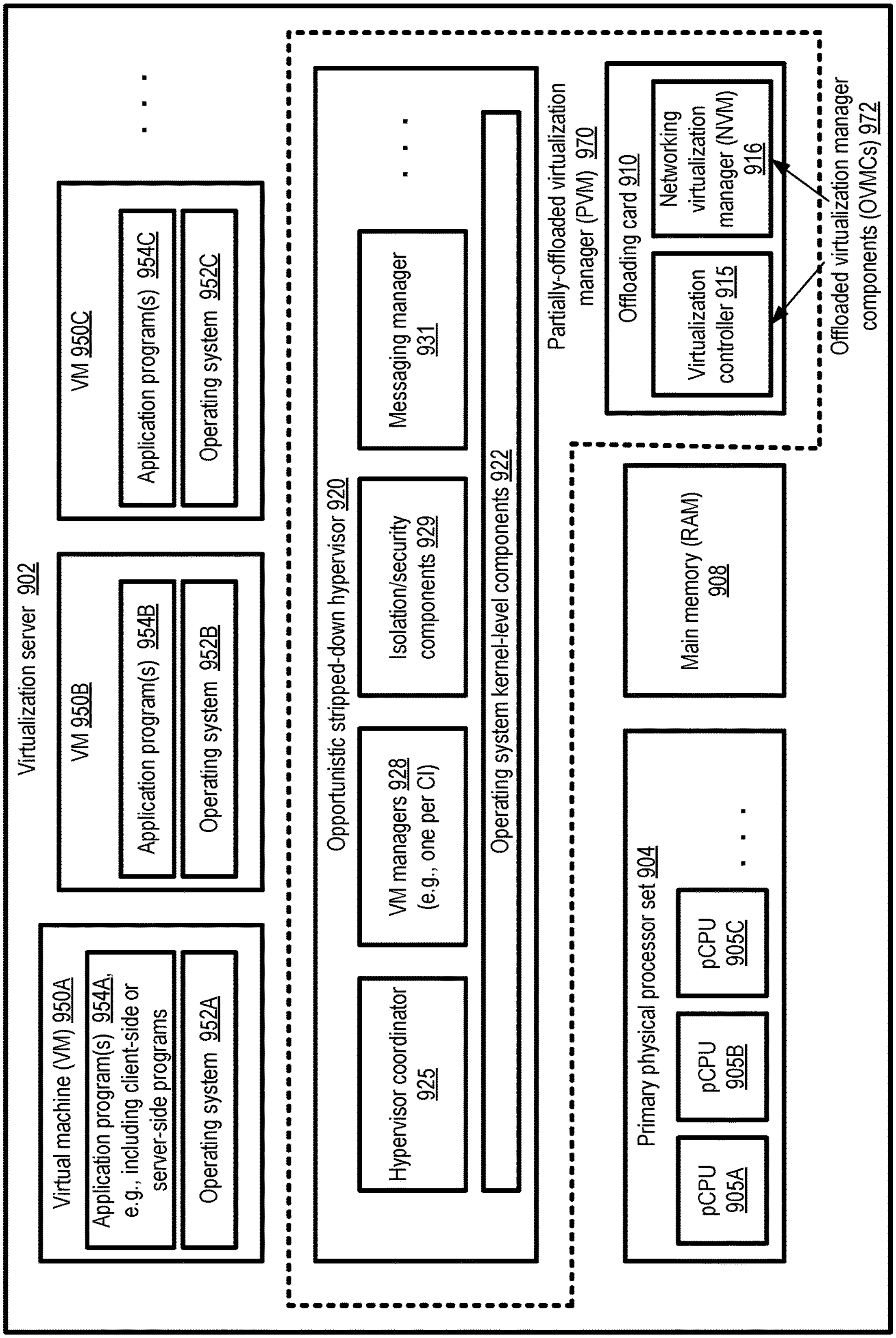
FIG. 9 illustrates example components of a virtualization server, including a networking virtualization manager at an offloading card, according to at least some embodiments.

FIG. 9 illustrates example components of a virtualization server, including a networking virtualization manager at an offloading card, according to at least some embodiments. As shown, a virtualization server 902 of a VCS of a cloud provider network may comprise a primary physical processor set 904, a main memory (e.g., one or more modules of random access memory or RAM) 908, a partially-offloaded virtualization manager (PVM) 970 and zero or more virtual machines (VMs) 950, such as VMs 950A-950C. (Virtualization server 902 may also comprise a number of other components, e.g., various persistent storage devices, which are not shown in FIG. 9 to avoid clutter.) The primary physical processor set 904 may comprise a number of physical CPUs (pCPUs), including pCPUs 905A-905C in the depicted embodiment. pCPUs may also be referred to as primary processors of the VS 902, e.g., to distinguish them from processing components on offloading cards of the VS. Virtualized versions of the pCPUs, called vCPUs or virtual CPUs, may be allocated to individual VMs by the PVM 970 during the lifetime of the VMs. Each VM 950 may comprise a respective instance of an operation system (e.g., operating systems 952A-952C) and a set of application programs (e.g., 954A-954C) being run on behalf of customers of the virtualized computing service. The application programs may include server-side programs implementing business logic of a network-accessible application, client-side programs which send application service requests to the server-side programs, and/or other programs in different embodiments.

The PVM 970 may comprise a set of virtualization management components (VMCs) including an opportunistic stripped-down hypervisor 920 (which uses the pCPUs) and one or more offloaded virtualization manager components (OVMCs) 972 which do not use the pCPUs in the depicted embodiment. OVMCs 972 may include, for example, a virtualization controller 915 and an NVM 916, running at an offloading card 910. As suggested by its name, the offloading card may be used to offload at least a subset of virtualization management tasks, required for the virtual machines, from the pCPUs, thereby freeing up more of the pCPUs' computing capacity to perform customer application tasks. Individual ones of the OVMCs may be implemented using a respective system-on-chip design in some embodiments. Although both OVMCs 972 are shown as being incorporated within a single offloading card 910 (e.g., a card attached via a PCIe (Peripheral Component Interconnect-Express) interconnect or another peripheral interconnect to the pCPUs) in the depicted embodiment, other approaches regarding the arrangement and organization of the OVMCs may be employed in different embodiments. For example, in one embodiment, a single system-on-chip implementation may be used to perform the functions of the virtualization controller and the NVM, thereby eliminating the need for two different OVMCs. In another embodiment, respective offloading cards may be used for the virtualization controller 915 and the NVM 916. The virtualization controller, as suggested by its name, may be responsible for organizing or orchestrating much of the virtualization management work performed at the VS 902 in the depicted embodiment—e.g., it may be the first of the components of the PVM to boot, trigger the launches of the other components of the PVM, communicate with the VCS control plane, make memory allocation decisions with respect to guest virtual machines, and so on. The NVM 916 may be responsible for implementing one or more networking protocols (including for example an encapsulation protocol used within the VCS) and acting as an intermediary between the VMs and networking endpoints outside the VS in the depicted embodiment.

Hypervisor 920 may be described as being stripped-down in the depicted embodiment because much of the work performed by at least some conventional hypervisors may be handled by the OVMCs 972 instead, thereby reducing the complexity and size of the hypervisor 920. In addition, hypervisor 920 may be designated as opportunistic because, under most circumstances, it may wait until a VM voluntarily relinquishes control of a pCPU 905 before the hypervisor uses CPU cycles. The hypervisor 920 may itself comprise a number of subcomponents in the depicted embodiment, including a set of operating system kernel-level components 922, a hypervisor coordinator 925, one or more VM managers 928, isolation/security components 929, and/or a messaging manager 931. The hypervisor coordinator 925, individual ones of the VM managers 928, the isolation/security components 929 and/or the messaging manager 931 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by VMs, etc.).

The kernel-level components 922 may provide support for various low-level operations such as the initial responses to VM exit instructions issued by the VMs (e.g., when a VM gives up a pCPU). The hypervisor coordinator 925, as implied by the name, may be responsible for orchestrating operations of the other subcomponents. The hypervisor coordinator 925 may, for example, implement an API which can be used for communications between the OVMCs 972 and the hypervisor, initiating VM launches and terminations (e.g., at the request of an OVMC), exposing metrics collected by the VM managers, providing debugging capabilities, and so on. Each VM manager 928 may be responsible for launching or instantiating a respective VM based on a specification provided by the coordinator 925, monitoring metrics and logs of the VM, and so on. The messaging manager 931 may act as an intermediary between the virtualization controller 915 and the hypervisor, e.g., by translating commands issued using a queue-based protocol by the virtualization controller into pipe messages within the hypervisor. The security and isolation components 929 may be responsible, for example, for scrubbing or cleaning up VM memory when a VM terminates, so that inadvertent sharing of data across VMs can be avoided. It is noted that the PVM may comprise additional components (not shown in FIG. 9) in at least some embodiments, while in at least one embodiment one or more of the PVM components shown in FIG. 9 may not be required. In some embodiments, an NVM may be implemented using pCPUs instead of being implemented on an offloading card as shown in FIG. 9.

Figure 10:
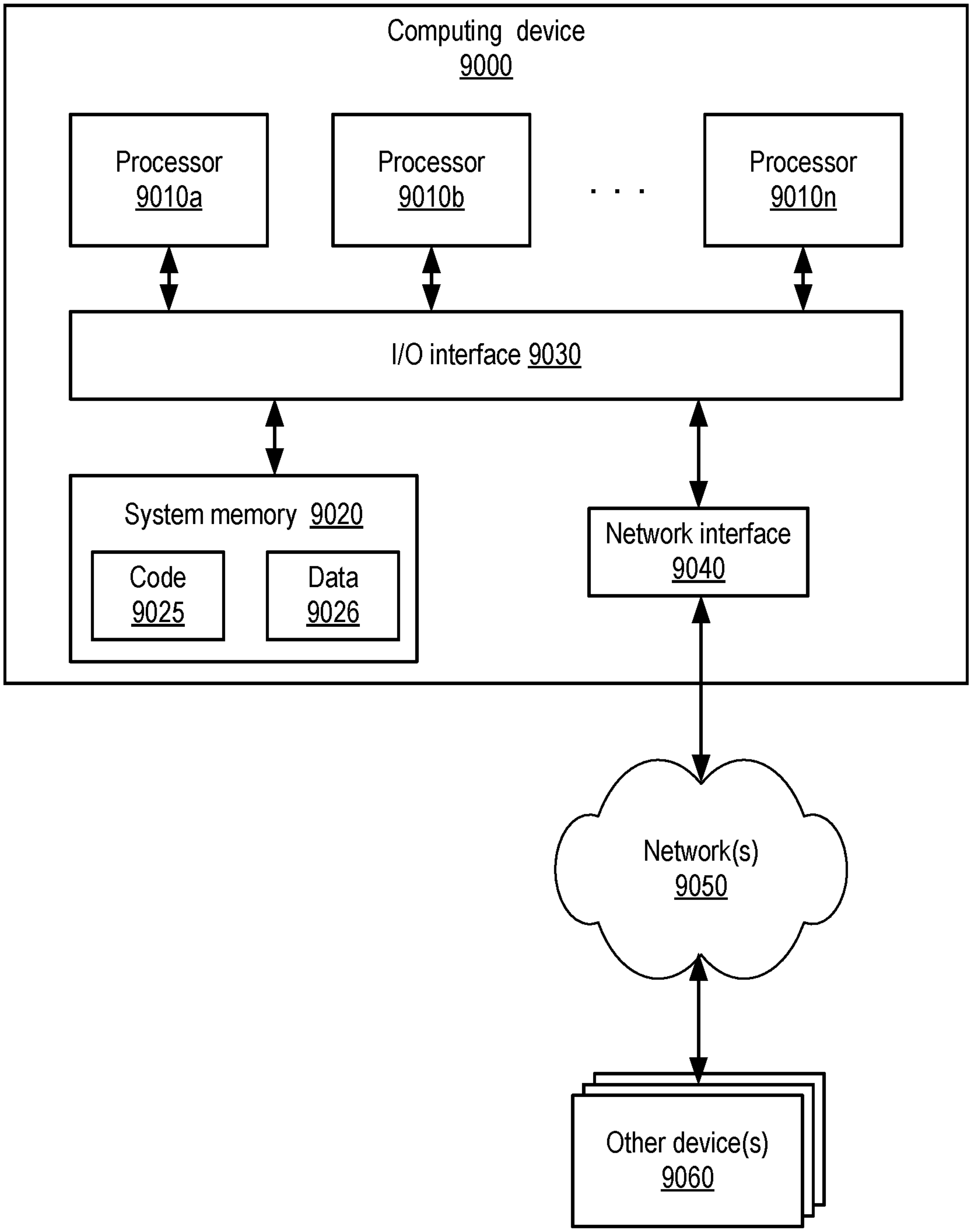
FIG. 10 is a block diagram illustrating an example computing device that may be used in at least some embodiments.

In at least some embodiments, a server that implements the types of techniques described herein (e.g., various operations of a provider network service such as a VCS, including operations performed at a virtualization server, a load balancer or other packet transmission intermediaries), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more processors and corresponding memory, of a load balancer, configured to distribute network packets among a set of target virtual machines of a virtualized computing service of a cloud computing environment;

a set of target servers of the virtualized computing service, wherein individual target servers of the set of target servers comprise (a) a respective networking virtualization manager and (b) a respective target virtual machine of the set of target virtual machines; and a health monitoring service of the cloud computing environment;

wherein one or more processors and corresponding memory, of the health monitoring service, is configured to:

in response to determining, using a health monitoring algorithm which comprises transmission of out-of-band messages, that a target virtual machine of the set of target virtual machines is unresponsive, provide a notification of unresponsiveness of the target virtual machine to at least the load balancer;

wherein one or more processors and corresponding memory, implementing a networking virtualization manager of a target server of the set of target servers, is configured to:

receive an encapsulation packet from the load balancer, formatted in accordance with an encapsulation protocol of the virtualized computing service;

determine that the encapsulation packet comprises an encapsulated packet directed to a particular target virtual machine which was launched at the target server; and in response to detecting, by the networking virtualization manager without communicating with the health monitoring service, that the particular target virtual machine is unable to process the encapsulated packet, transmit an in-band message to the load balancer, wherein the in-band message indicates that the particular target virtual machine is unable to process the encapsulated packet, and wherein the in-band message comprises a portion of content of the encapsulation packet; and wherein the one or more processors and corresponding memory, of the load balancer, is configured to:

in response to the in-band message, store metadata indicating that additional encapsulated packets directed to the particular target virtual machine are not to be sent from the load balancer to the target server, wherein the metadata is stored without receiving an out-of-band notification indicating unresponsiveness of the particular target virtual machine from the health monitoring service.

2. The system as recited in claim 1, wherein the in-band message comprises an indication of a probable cause, determined by the networking virtualization manager, for an inability of the particular target virtual machine to process the encapsulated packet.

3. The system as recited in claim 2, wherein probable cause comprises one of: (a) a termination of execution of the particular target virtual machine or (b) a workload level of the particular target virtual machine.

4. The system as recited in claim 1, wherein the in-band message is formatted in accordance with ICMP (Internet Control Message Protocol).

5. The system as recited in claim 1, wherein in response to the in-band message, the load balancer is further configured to:

cause a network connection established between a source server and the load balancer to be reset, wherein the encapsulated packet was generated at a client-side virtual machine running at the source server.

6. A computer-implemented method, comprising:

receiving, at a first network virtualization manager of a first server of a virtualized computing service, an encapsulation packet from a packet transmission intermediary, wherein the encapsulation packet is formatted in accordance with an encapsulation protocol of the virtualized computing service;

detecting, by the first network virtualization manager, that the encapsulation packet comprises an encapsulated packet directed to a first virtualized run-time environment which was launched at the first server; and in response to determining, by the first network virtualization manager, that the first virtualized run-time environment is unable to process the encapsulated packet, transmitting an in-band message, indicating unresponsiveness of the first virtualized run-time environment, to the packet transmission intermediary by the first network virtualization manager, wherein the in-band message comprises a portion of content of the encapsulation packet; and initiating, by a processor and corresponding memory, of the packet transmission intermediary, an action in response to the indication of unresponsiveness.

7. The computer-implemented method as recited in claim 6, further comprising:

storing, by the first network virtualization manager, in a field within the indication of unresponsiveness, a value indicating a reason why the first virtualized run-time environment is unable to process the encapsulated packet.

8. The computer-implemented method as recited in claim 7, wherein the value indicates one of: (a) that the first virtualized run-time environment has terminated execution or (b) that a workload level of the first virtualized run-time environment prevents the first virtualized run-time environment from processing the encapsulated packet.

9. The computer-implemented method as recited in claim 6, wherein the determining, by the first network virtualization manager, that the first virtualized run-time environment is unable to process the encapsulated packet comprises:

receiving, by the first network virtualization manager, the indication from the first virtualized run-time environment that a workload level of the first virtualized run-time environment prevents the first virtualized run-time environment from processing additional encapsulated packets.

10. The computer-implemented method as recited in claim 6, wherein the indication of unresponsiveness is formatted in accordance with ICMP (Internet Control Message Protocol).

11. The computer-implemented method as recited in claim 6, wherein the packet transmission intermediary comprises a load balancer.

12. The computer-implemented method as recited in claim 6, wherein the packet transmission intermediary comprises a second network virtualization manager at a second server of the virtualized computing service, wherein the encapsulated packet is generated by a second virtualized run-time environment at the second server.

13. The computer-implemented method as recited in claim 6, further comprising:

causing, in response to determining that the first virtualized run-time environment is unable to process the encapsulated packet, a reset of a network connection used for the encapsulation packet.

14. The computer-implemented method as recited in claim 13, wherein causing the reset of the network connection comprises:

transmitting a connection reset request by the first network virtualization manager to a second network virtualization manager, wherein the second network virtualization manager runs at a second server of the virtualized computing service, and wherein the encapsulated packet originates at a second virtualized run-time environment of the second server.

15. The computer-implemented method as recited in claim 13, wherein causing the reset of the network connection comprises:

transmitting a connection reset request by the packet transmission intermediary to a second network virtualization manager, wherein the second network virtualization manager runs at a second server of the virtualized computing service, and wherein the encapsulated packet originates at a second virtualized run-time environment of the second server.

16. One or more non-transitory computer-accessible storage media storing program instructions that when executed on a processor:

obtain, at a network virtualization manager of a server, an encapsulation packet from a packet processing intermediary, wherein the encapsulation packet is formatted in accordance with an encapsulation protocol;

determine, by the network virtualization manager, that the encapsulation packet comprises an encapsulated packet directed to a virtualized run-time environment which was launched at the server; and in response to a determination, made by the network virtualization manager, that the virtualized run-time environment is unable to process the encapsulated packet, transmit an in-band message to the packet processing intermediary, wherein the in-band message comprises a portion of content of the encapsulation packet and indicates that the virtualized run-time environment is unable to process the encapsulated packet;

wherein the packet processing intermediary is to initiate an action in response to the in-band message indicating that the virtualized run-time environment is unable to process the encapsulated packet.

17. The one or more non-transitory computer-accessible storage media as recited in claim 16, storing further program instructions that when executed on the processor: cause the packet processing intermediary to select a particular action to be initiated in response to the message indicating that the virtualized run-time environment is unable to process the encapsulated packet, wherein the particular action is based at least in part on an indication of a reason for the inability of the virtualized run-time environment to process the encapsulated packet.

18. The one or more non-transitory computer-accessible storage media as recited in claim 17, wherein the particular action comprises one or more of: (a) storing metadata indicating that additional packets are not to be directed to the virtualized run-time environment from the packet processing intermediary, (b) modifying a parameter of a load balancing algorithm, or (c) causing a reset of a network connection associated with the encapsulation packet.

19. The one or more non-transitory computer-accessible storage media as recited in claim 16, wherein the message indicating that the virtualized run-time environment is unable to process the encapsulated packet is formatted in accordance with ICMP (Internet Control Message Protocol).

20. The one or more non-transitory computer-accessible storage media as recited in claim 16, wherein the network virtualization manager runs on an offloading card attached via a peripheral interconnect to a primary processor of the server.

* * * * *